(12) United States Patent
Yu et al.

(10) Patent No.: US 9,734,783 B2
(45) Date of Patent: Aug. 15, 2017

(54) DISPLAYS WITH HIGH IMPEDANCE GATE DRIVER CIRCUITRY

(71) Applicant: Apple Inc., Cupertino, CA (US)

(72) Inventors: Cheng-Ho Yu, Cupertino, CA (US); Keitaro Yamashita, Nishinomiya (JP); Ting-Kuo Chang, Cupertino, CA (US); Yun Wang, San Jose, CA (US); Hopil Bae, Sunnyvale, CA (US); Kingsuk Brahma, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 54 days.

(21) Appl. No.: 14/864,136

(22) Filed: Sep. 24, 2015

(65) Prior Publication Data

US 2016/0275889 A1    Sep. 22, 2016

Related U.S. Application Data

(60) Provisional application No. 62/135,635, filed on Mar. 19, 2015.

(51) Int. Cl.
*G09G 3/36* (2006.01)
*G06F 3/041* (2006.01)

(52) U.S. Cl.
CPC ......... *G09G 3/3648* (2013.01); *G06F 3/0412* (2013.01); *G06F 3/0416* (2013.01); *G09G 3/3677* (2013.01); *G09G 2300/0452* (2013.01); *G09G 2300/0871* (2013.01); *G09G 2310/0289* (2013.01); *G09G 2310/061* (2013.01); *G09G 2310/08* (2013.01); *G09G 2330/021* (2013.01); *G09G 2354/00* (2013.01)

(58) Field of Classification Search
CPC .. G09G 3/3648; G09G 3/0412; G09G 3/0416; G09G 3/3677; G06F 3/0412
See application file for complete search history.

(56) References Cited

U.S. PATENT DOCUMENTS 6,265,897 B1 * 7/2001 Poirier ............... H03K 19/0963 326/113
6,980,184 B1   12/2005 Stewart et al.
(Continued)

FOREIGN PATENT DOCUMENTS

WO    0197378    12/2001

*Primary Examiner* — Ricardo L Osorio
(74) *Attorney, Agent, or Firm* — Treyz Law Group, P.C.; Jason Tsai

(57) ABSTRACT

A touch screen display may include gate line driver circuitry coupled to a display pixel array. The display may be provided with intra-frame pausing (IFP) capabilities, where touch or other operations may be performed during one or more intra-frame blanking intervals. In one suitable arrangement, a gate driver may be operable in a high impedance mode, where the output of the gate driver is left floating during touch or IFP intervals. In another suitable arrangement, the gate driver may be operable in an IFP reduced stress mode, where a digital pass gate in the gate driver is deactivated during IFP intervals. In yet another suitable arrangement, the gate driver may be operable in an all-gate-high (AGH) power-down mode, where the output of each gate driver in the driver circuitry is driven high in parallel when the displayed is being powered off. These arrangements may be implemented in any suitable combination.

20 Claims, 12 Drawing Sheets

(56) References Cited

U.S. PATENT DOCUMENTS

| | | | |
|---|---|---|---|
| 8,866,652 B2* | 10/2014 | Singer | H03M 1/0836 |
| | | | 327/296 |
| 9,076,370 B2 | 7/2015 | Tanaka | |
| 9,276,083 B2* | 3/2016 | Sinha | H01L 29/66477 |
| 9,379,694 B2* | 6/2016 | den Besten | H03K 17/005 |
| 2008/0303769 A1 | 12/2008 | Tobita | |
| 2015/0269897 A1 | 9/2015 | Kitsomboonloha et al. | |
| 2015/0348487 A1 | 12/2015 | Zheng et al. | |

\* cited by examiner

DISPLAYS WITH HIGH IMPEDANCE GATE DRIVER CIRCUITRY

This application claims the benefit of provisional patent application No. 62/135,635 filed on Mar. 19, 2015, which is hereby incorporated by reference herein in its entirety.

BACKGROUND

This relates generally to electronic devices, and more particularly, to electronic devices with touch screen displays.

Touch screen displays are prevalent in many applications, including consumer electronics devices such as smartphones, tablet devices, and laptop and desktop computers. The display function in such devices is typically performed by a liquid crystal display (LCD), plasma, or organic light emitting diode (OLED) display element array that is connected to a grid of source (data) and gate (select) metal traces. The display element array is often formed on a transparent panel such as a glass panel, which serves as a protective shield. The data and select lines of the display element array may be driven by a display driver integrated circuit (IC). The driver IC receives an image or video signal, which it then decodes into raster scan pixel values (color or gray scale) and writes them to the display element array during each frame, by driving the data and select lines. This process is repeated at a high enough frame rate so as to render video.

The touch gesture detection function in such devices is typically performed using a capacitance sensing subsystem in which a touch transducer grid structure overlays the display element array. The touch transducer structure is stimulated and sensed by touch controller circuitry. A touch stimulus signal is applied to the row segments of the grid, while simultaneously sensing the column segments (to detect a single-touch or a multi-touch gesture). Touch detection is typically performed during a blanking interval portion of the frame, while the display function is performed during a display interval portion of the frame.

The touch transducer grid structure can be implemented as a light transparent electrode plate that covers the display element array and may be formed on a rear surface of the protective panel. In some cases, the transparent electrode plate is also connected to the display elements, serving to deliver a "common voltage" to the display elements from a voltage source circuit often referred to as a Vcom conditioning circuit. The Vcom conditioning circuit helps improve the display function by adjusting a voltage on the transparent conductor plate that changes the light modulation characteristics of the connected display elements (during the display interval). As such, the transparent electrode plate is dual purposed in that it is used for both the display function and as the touch transducer grid structure.

As such, the touch screen display alternates between the display interval during which the display element array is activated and the blanking (or touch) interval during which the touch gesture detection function is activated. During each display interval, an entire frame is loaded into the display element array. The touch interval is typically positioned between successive display intervals (i.e., each touch interval occurs only after an entire frame has been scanned in). It is within this context that the embodiments described herein arise.

SUMMARY

An electronic device having a liquid crystal display (LCD) is provided. The liquid crystal display may include display pixel circuitry formed on a glass substrate. Thin-film transistor structures may be formed on the glass substrate.

The display pixel circuitry may include a display pixel array and gate driver circuitry coupled to the array. The gate driver circuitry may include a plurality of gate drivers connected in a chain. In accordance with an embodiment, the gate driver may include a digital latching circuit that generates a latch output signal, a digital pass gate (e.g., a transmission gate) that receives the latch output signal from the latching circuit, and a pull-down transistor that is coupled in series with the pass gate and that is turned off during a blanking interval (e.g., a touch interval or an intra-frame-pausing period) to place the gate driver in a high impedance mode. In one suitable arrangement, a logic gate (e.g., a logic XOR gate) may be interposed between the latching circuit and the pull-down transistor. In another suitable arrangement, the pull-down transistor may directly receive a high impedance mode control signal.

In accordance with another embodiment, the gate driver may include a gating logic circuit (e.g., a logic NOR gate) through which the latch output signal is coupled to the pass gate. In this embodiment, the pull-down transistor may be controlled using a first control signal (e.g., the high impedance mode control signal), whereas the gating logic circuit may be controlled using a second control signal (e.g., an intra-frame-pause reduced stress mode control signal) that is different than the first control signal. If desired, the gate driver may further include a tail transistor that is coupled in parallel with the pull-down transistor, wherein the tail transistor receives a fourth control signal that is generated from a combination of the first and second control signals.

In accordance with yet another embodiment, the gate driver may include an all-gate-high (AGH) pull-up circuit that is coupled to the pass gate and that is always turned on when the display circuitry is operated in a power-down mode. In one suitable arrangement, the pull-up circuit may include a pull-up transistor having a source terminal that receives a positive power supply voltage, a gate terminal that receives an adjustable control voltage, and a drain terminal that is directly coupled to the pass gate. In another suitable arrangement, the pull-up circuit may include a pull-up transistor having a source terminal that receives an adjustable control voltage, a gate terminal that receives a ground power supply voltage, and a drain terminal that is directly coupled to the pass gate.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

DETAILED DESCRIPTION

Displays are widely used in electronic devices. For example, displays may be used in computer monitors, laptop computers, media players, cellular telephones and other handheld devices, tablet computers, televisions, and other equipment. Displays may be based on plasma technology, organic-light-emitting-diode technology, liquid crystal structures, etc. Liquid crystal displays are popular because they can exhibit low power consumption and good image quality. Liquid crystal display (LCD) structures are sometimes described herein as an example.

Figure 1:
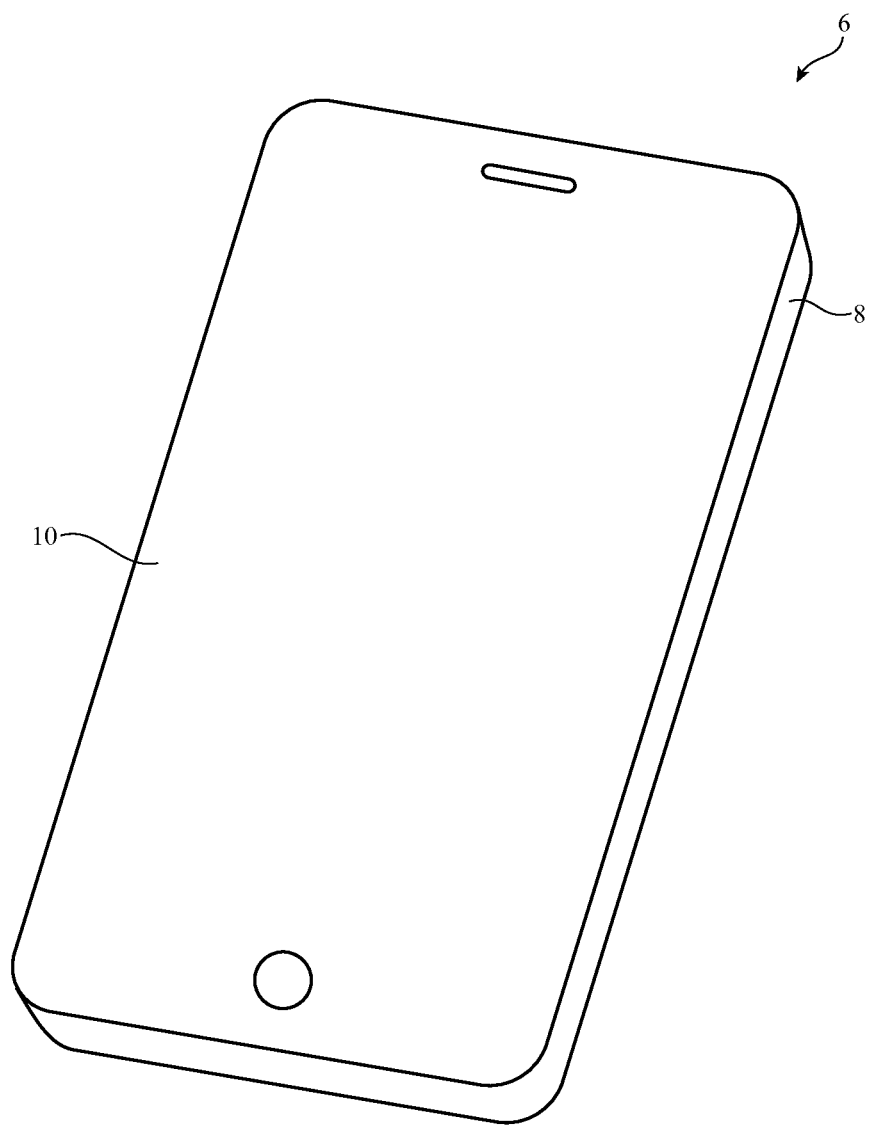
FIG. 1 is a perspective view of an illustrative electronic device having a display such as a liquid crystal display in accordance with an embodiment.

A perspective view of an illustrative electronic device with a display is shown in FIG. 1. As shown in FIG. 1, electronic device 6 may have a housing such as housing 8. Housing 8 may be formed from materials such as plastic, glass, ceramic, metal, fiber composites, and combinations of these materials. Housing 8 may have one or more sections. For example, device 6 may be provided with a display housing portion and a base housing portion that are coupled by hinges. In the arrangement of FIG. 1, device 6 has a front face and a rear face. Display 10 of FIG. 1 is mounted on the front face of housing 8. Other configurations may be used if desired.

The illustrative configuration of device 6 in FIG. 1 is merely illustrative. In general, electronic device 6 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Display 10 may be a liquid crystal display. A touch sensor array may be incorporated into display 10 (e.g., to form a touch screen display). The touch sensor may be based on acoustic touch technology, force sensor technology, resistive sensor technology, or other suitable types of touch sensor. With one suitable arrangement, the touch sensor portion of display 10 may be formed using a capacitive touch sensor arrangement. With this type of configuration, display 10 may include a touch sensor array that is formed from rows and columns of capacitive touch sensor electrodes. In other suitable arrangements, the touch sensor array may be grouped into separate discrete regions.

Figure 2:
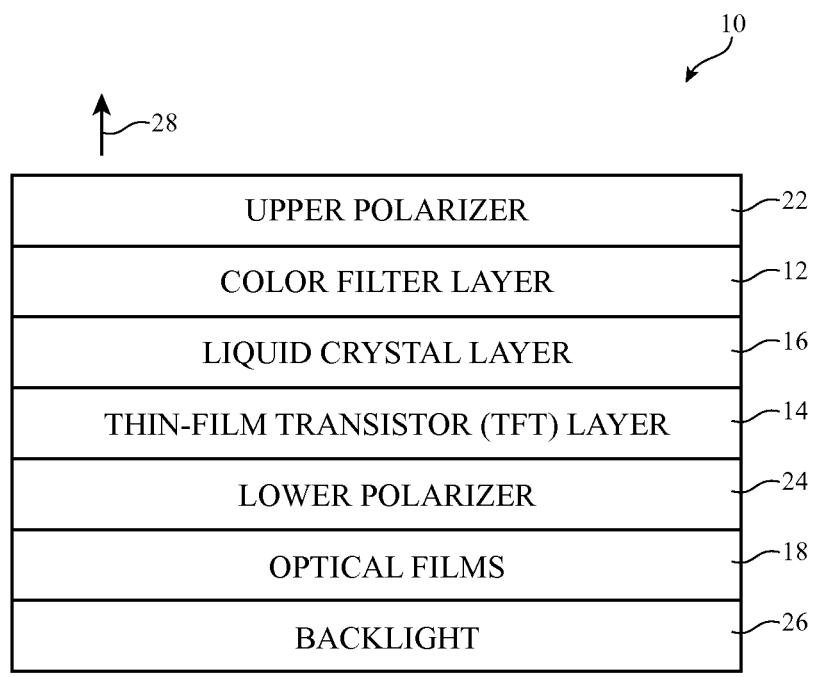
FIG. 2 is cross-sectional side view of an illustrative display in accordance with an embodiment of the present invention.

A cross-sectional side view of a portion of a display of the type that may be used in forming display 10 of FIG. 1 is shown in FIG. 2. As shown in FIG. 2, display 10 may include color filter (CF) layer 12 and thin-film-transistor (TFT) layer 14. Color filter layer 12 may include an array of colored filter elements. In a typical arrangement, the pixels of layer 12 each include three types of colored pixels (e.g., red, green, and blue subpixels). Liquid crystal (LC) layer 16 includes liquid crystal material and is interposed between color filter layer 12 and thin-film-transistor layer 14. Thin-film-transistor layer 14 may include electrical components such as thin film transistors, capacitors, and electrodes for controlling the electric fields that are applied to liquid crystal layer 16. In other suitable arrangements, thin-film transistor layer 14 may be formed on top of the liquid crystal material while the color filter layer 12 may be formed below the liquid crystal material.

Display 10 may have upper and lower polarizer layers 22 and 24. Backlight 26 may provide backside illumination for display 10. Backlight 26 may include a light source such as a strip of light-emitting diodes. Backlight 26 may also include a light-guide plate and a back reflector. The back reflector may be located on the lower surface of the light-guide panel to prevent light leakage. Optical films 18 may be interposed between the lower polarizer 24 and the backlight unit 26. Optical films 18 may include diffuser layers for helping to homogenize the backlight and thereby reduce hotspots, compensation films for enhancing off-axis viewing, and brightness enhancement films (also sometimes referred to as turning films or prism films) for collimating the backlight. Light from the light source may be injected into an edge of the light-guide panel and may scatter upwards in direction 28 through display 10. An optional cover layer such as a layer of coverglass may be used to cover and protect the layers of display 10 that are shown in FIG. 2.

Touch sensor structures may be incorporated into one or more of the layers of display 10. In a typical touch sensor configuration, an array of capacitive touch sensor electrodes may be implemented using pads and/or strips of a transparent conductive material such as indium tin oxide. Other touch technologies may be used if desired (e.g., resistive touch, acoustic touch, optical touch, etc.). Indium tin oxide or other transparent conductive materials or non-transparent conductors may also be used in forming signal lines in display 10 (e.g., structures for conveying data, power, control signals, etc.).

In black and white displays, color filter layer 12 can be omitted. In color displays, color filter layer 12 can be used to impart colors to an array of image pixels. Each image pixel may, for example, have three corresponding liquid crystal diode subpixels. Each subpixel may be associated with a separate color filter element in the color filter array. The color filter elements may, for example, include red (R) color filter elements, blue (B) color filter elements, and green (G) color filter elements. These elements may be arranged in rows and columns. For example, color filter elements can be arranged in stripes across the width of display 10 (e.g., in a repeating patterns such as a RBG pattern or BRG pattern) so that the color filter elements in each column are the same (i.e., so that each column contains all red elements, all blue elements, or all green elements). By controlling the amount of light transmission through each subpixel, a desired colored image can be displayed.

The amount of light transmitted through each subpixel can be controlled using display control circuitry and electrodes. Each subpixel may, for example, be provided with a transparent indium tin oxide electrode. The signal on the subpixel electrode, which controls the electric field through an associated portion of the liquid crystal layer and thereby controls the light transmission for the subpixel, may be applied using a thin film transistor. The thin film transistor may receive data signals from data lines and, when turned on by an associated gate line, may apply the data line signals to the electrode that is associated with that thin-film transistor.

Figure 3:
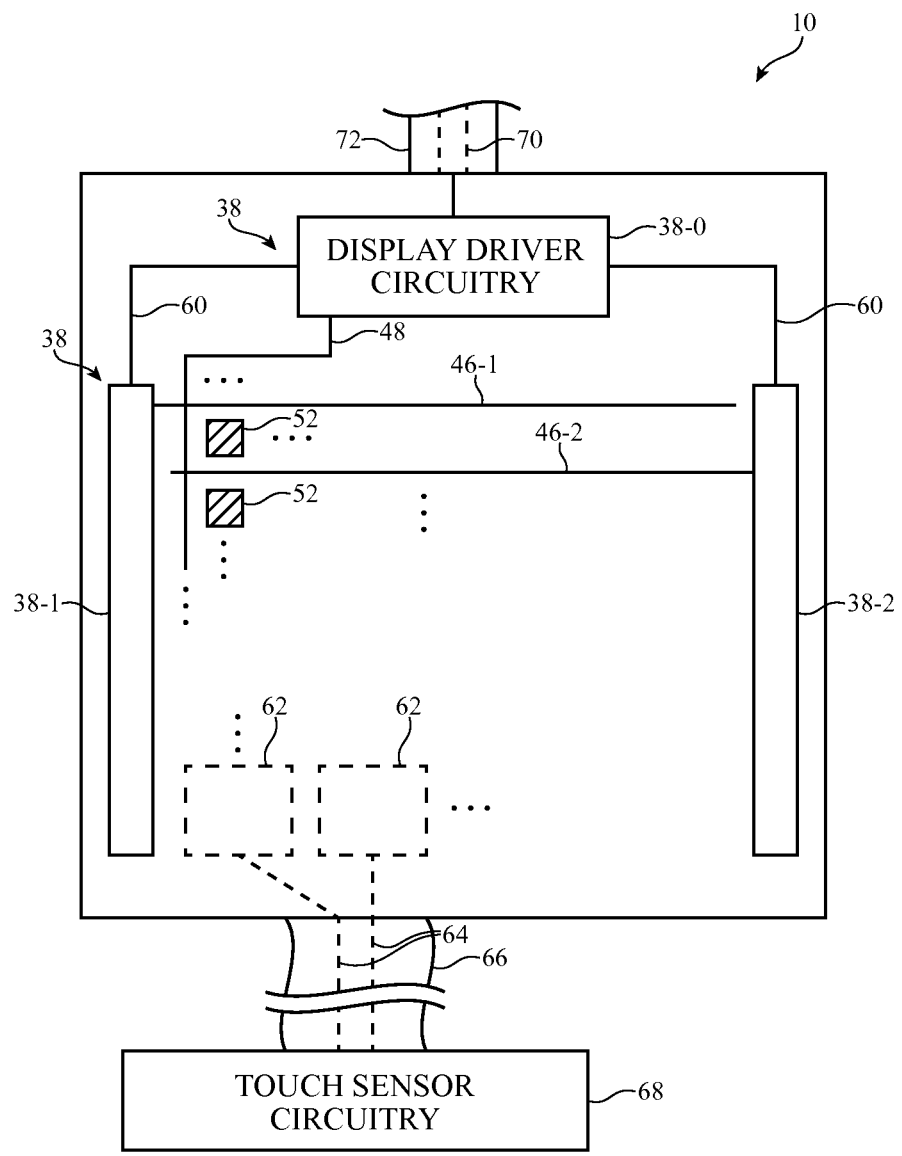
FIG. 3 is an illustrative diagram showing how a display may be provided with image pixel structures and touch sensor elements in accordance with an embodiment of the present invention.

A top view of an illustrative display is shown in FIG. 3. As shown in FIG. 3, display 10 may include an array of image pixels 52. Pixels 52 (which are sometimes referred to as subpixels) may each be formed from electrodes that give rise to an electric field and a portion of liquid crystal layer 16 (FIG. 2) that is controlled by that electric field. Each image pixel may have an electrode that receives a data line signal from an associated transistor and a common electrode. The common electrodes of display 10 may be formed from a layer of patterned indium tin oxide or other conductive planar structures. The patterned indium tin oxide structure or other conductive structures that are used in forming the common plane for image pixels 52 may also be used in forming capacitive touch sensor elements 62.

As illustrated by touch sensor elements 62 of FIG. 3, touch sensor elements (electrodes) may be coupled to touch sensor circuitry 68. Touch sensor elements 62 may include rectangular pads of conductive material, vertical and/or horizontal strips of conductive material, and other conductive structures. Signals from elements 62 may be routed to touch sensor processing circuitry 68 via traces 64 on flex circuit cable 66 or other suitable communications path lines.

In a typical arrangement, there are fewer capacitor electrodes 62 in display 10 than there are image pixels 52, due to the general desire to provide more image resolution than touch sensor resolution. For example, there may be hundreds or thousands of rows and/or columns of pixels 52 in display 10 and only tens or hundreds of rows and/or columns of capacitor electrodes 62.

Display 10 may include display driver circuitry 38. Display driver circuitry 38 may receive image data from processing circuitry in device 6 using conductive lines 70 in path 72. Path 72 may be, for example, a flex circuit cable or other communications path that couples display driver circuitry 38 to integrated circuits on a printed circuit board elsewhere in device 6 (as an example).

Display driver circuitry 38 may include control circuit 38-0, gate line driver circuit 38-1, and gate line driver circuit 38-2. Display driver control circuit 38-0 may be implemented using one or more integrated circuits (e.g., one or more display driver integrated circuits). Circuits 38-1 and 38-2 (sometimes referred to as gate line and Vcom driver circuitry) may be incorporated into control circuit 38-0 or may be implemented using thin-film transistors on layer 14 (FIG. 2). Gate line driver circuits 38-1 and 38-2 implemented using thin-film transistor structures on layer 14 may sometimes be referred to as gate driver on array or "GOA." Paths such as paths 60 may be used to interconnect display driver circuitry 38. Display driver circuitry 38 may also be implemented using external circuits or other combinations of circuitry, if desired.

Display driver circuitry 38 may control the operation of display 10 using a grid of signal lines such as data lines 48, gate lines 46, and Vcom lines (not shown). In the example of FIG. 3, gate driver circuit 38-1 may serve to provide gate line signals to display pixels 52 arranged along even rows in the array (e.g., by supplying gate line signals on even gate lines 46-1), whereas gate driver circuit 38-2 may serve to provide gate line signals to display pixels 52 arranged along odd rows in the array (e.g., by supplying gate line signals on odd gate lines 46-2). This type of interlaced driving scheme in which gate line driver circuits drive signals from two different sides of the array in this way is merely illustrative. In other suitable arrangements, gate drivers may be formed on only one side, or on more than two sides of the image pixel array.

Note that the touch function may be performed during a touch interval portion of the video frame, and in particular during a "blanking" interval (rather than during a display interval) of the video frame. In conventional displays, the touch interval is typically inserted only between successive display intervals that each display an entire image/video frame (i.e., conventional touch screen displays are only configured to implement inter-frame pause for touch sensing).

Figure 4:
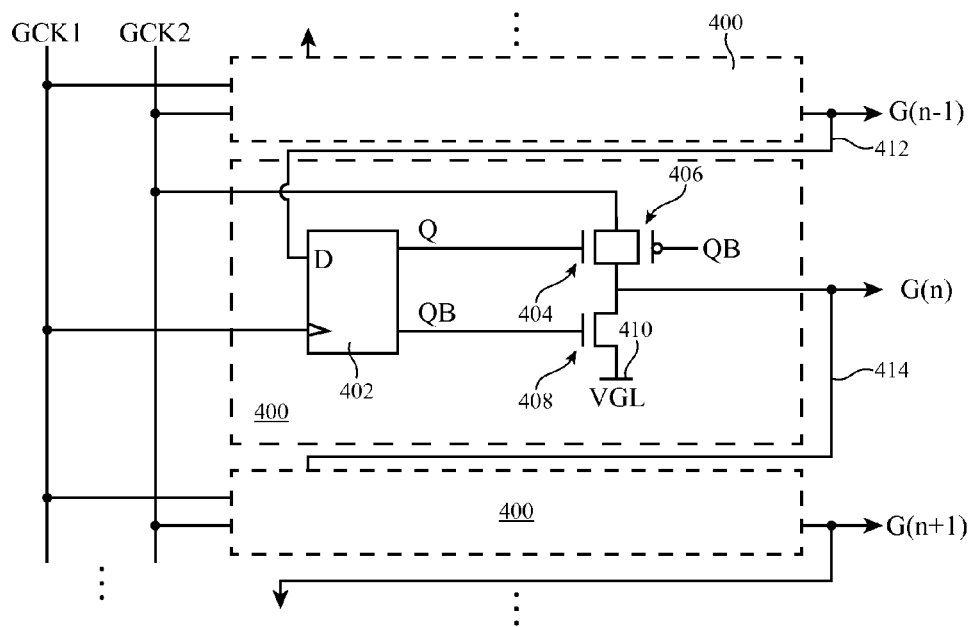
FIG. 4 is a circuit diagram of conventional gate driver circuits having digital components.

FIG. 4 is a circuit diagram of conventional gate driver circuitry that can be used to support display and touch functions. As shown in FIG. 4, the conventional driver circuitry includes a chain of gate driver circuits 400 that receives a first clock signal GCK1 and a second clock signal GCK2. Each gate driver circuit 400 includes a flip-flop circuit 402, an n-channel transistor 404, a p-channel transistor 406, and a pull-down transistor 408. The n-channel transistor 404 and the p-channel transistor 406 are connected in parallel and are sometimes referred to collectively as a "pass gate" or a transmission gate. The pass gate has a first terminal that receives GCK2 and a second terminal that is coupled to ground line 410 (i.e., a power supply line on which ground voltage VGL is provided). The second terminal also serves as the output of gate driver 400. The circuit components within gate drivers 400 may all be formed using thin-film transistor structures.

In particular, the gate driver 400 that produces the $n^{th}$ gate line signal G(n) has a flip-flop 402 having a clock input that receives GCK1, a data input that receives gate line signal G(n−1) from a preceding gate driver in the chain via signal path 412, a first data output (i.e., an output terminal on which signal Q is provided) connected to the gate of transistor 404, and a second data output (i.e., an output terminal on which signal QB is provided) connected to the gate of pull-down transistor 408 and transistor QB. Signal QB is simply an inverted version of signal Q. Gate driver output signal G(n) may be fed to a successive gate driver 400 in the chain via signal path 414.

Still referring to FIG. 4, the gate driver that precedes the $n^{th}$ gate driver (i.e., the driver gate that outputs gate driver signal G(n−1)) may receive GCK2 at the clock input of the flip-flop 402 and may receive GCK1 at the first (upper) terminal of the pass gate. Similarly, the gate driver that succeeds the $n^{th}$ gate driver (i.e., the driver gate that outputs gate driver signal G(n+1)) receives GCK2 at the clock input of the flip-flop 402 and receives GCK1 at the first (upper) terminal of the pass gate. In general, the clock signals GCK1 and GCK2 are fed to consecutive gate drivers in this alternating fashion along the chain of gate drivers 400.

Figure 5:
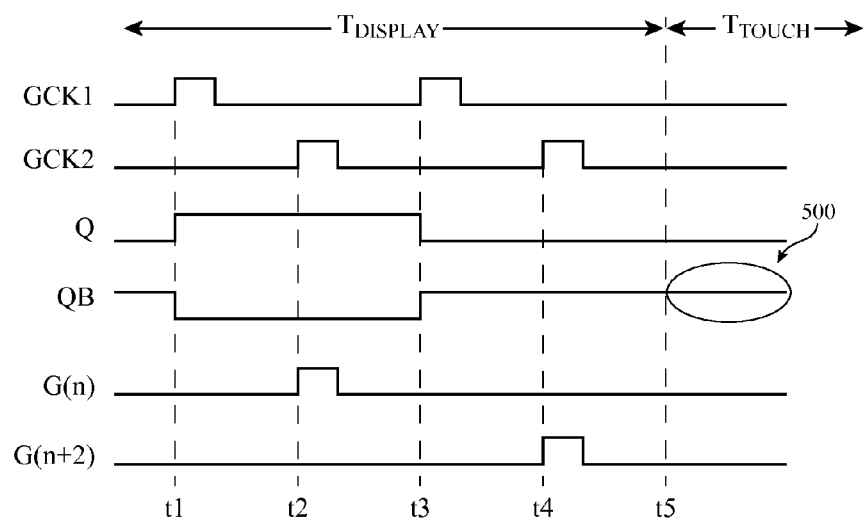
FIG. 5 is a timing diagram of relevant waveforms that illustrate the operation of the conventional driver circuits of FIG. 4.

FIG. 5 is a timing diagram showing relevant waveforms that illustrate the operation of the conventional gate driver circuits of FIG. 4. At time t1, GCK1 pulses high, which drives Q high and QB low to activate the pass gate. At time t2, GCK2 pulses high, which drives G(n) high temporarily since the pass gate is activated. At time t3, GCK1 pulses high, which drives Q low and QB high to deactivate the pass gate. At time t 4, GCK2 pulses high, which drives G(n+2) high temporarily. In general, the operations from time t1-t4 can be iterated to shift the gate pulse sequentially through the entire gate driver chain to successively generate gate line signals across the entire display during an active display period $T_{DISPLAY}$.

At time t5, the display may be configured to operate to support touch functions (i.e., during blanking period $T_{TOUCH}$). As shown by marked portion 500 in FIG. 5, signal QB may be high during the touch interval, which turns on pull-down transistor 408 and drives the corresponding gate line output to VGL. This may or may not be desirable. Since at least one of the gate lines is driven to VGL, it may be necessary to include additional tail transistors (not shown) for driving each of the gate lines to VGL during touch, thereby increasing the area and cost of the gate driver circuitry. This requirement may also demand a lower overall resistance for the ground line 410 that is supplying VGL to each of the gate lines.

Figure 6:
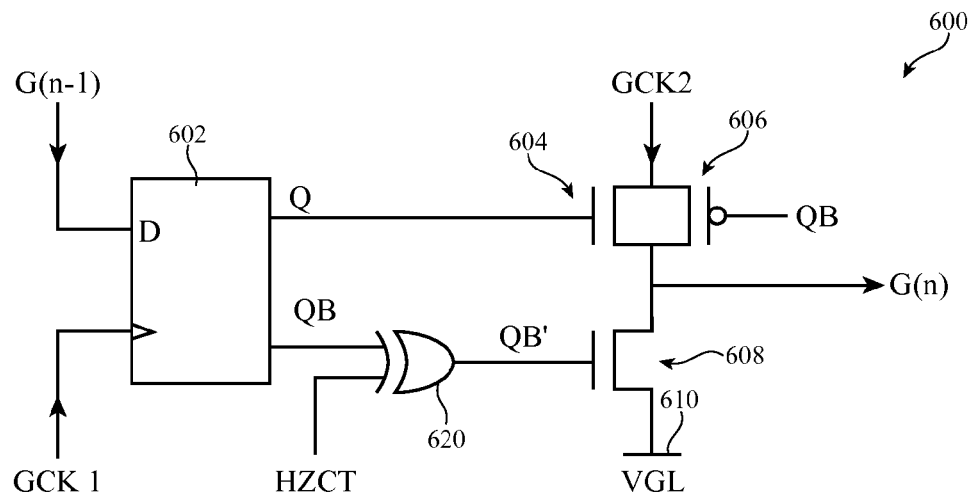
FIG. 6 is a circuit diagram of an illustrative gate driver circuit operable in high impedance mode in accordance with an embodiment.

In accordance with an embodiment of the present invention, a gate driver circuit 600 is provided that is operable in a high impedance (or "high-Z") mode that prevents the gate driver from actively biasing the gate line to VGL during touch operations (see, e.g., FIG. 6). As shown in FIG. 6, gate driver circuit 600 may include a clocked storage element 602 (e.g., a digital latch circuit), an n-channel transistor 604, a p-channel transistor 606, a pull-down transistor 608, and a logic gate such as logic exclusive-OR (XOR) gate 620. The n-channel transistor 604 and the p-channel transistor 606 are connected in parallel and are sometimes referred to collectively as a "pass gate" or a transmission gate. The pass gate may have a first terminal that receives a second clock signal GCK2 and a second terminal that is coupled to a power supply line 610 (e.g., a power supply line on which a ground voltage VGL is provided) via pull-down transistor 608. The second terminal may also serve as the output of gate driver 600. In general, the circuit components within gate driver 600 may all be formed using thin-film transistor structures (e.g., TFT structures in layer 14 of FIG. 2). The clock signals GCK1 and GCK2 may be provided to each gate driver 600 via a global clock path in an alternating fashion in the way described in connection with FIG. 2 (as an example).

Latch 602 may have a clock input that receives a first clock signal GCK1, a data input that receives a gate line signal (e.g., G(n−1)) from a preceding gate driver, a first data output on which first latch output Q is provided, and a second data output on which second latch output QB is provided. N-channel transistor 604 may have a gate terminal that receives signal Q, whereas p-channel transistor 606 may have a gate terminal that receives signal QB. Signal QB may be the complement of signal Q (e.g., signals Q and QB are inverted versions of one another).

In particular, the logic XOR gate 620 may have a first input that receives QB from data latch 602, a second input that receives a high-Z control signal HZCT, and an output that is coupled to the gate of pull-down transistor 608. A gated signal QB' may be provided at the output of logic gate 620 for controlling the state of the pull-down transistor 608. Configured in this way, signal HZCT can be asserted to help turn off the pull-down transistor 608 (to activate the high impedance mode) during the touch period and deasserted to allow the pull-down transistor 608 to be selectively activated during the display period. In other words, high-Z control signal HZCT should be low during display periods and high during touch periods.

Figure 7:
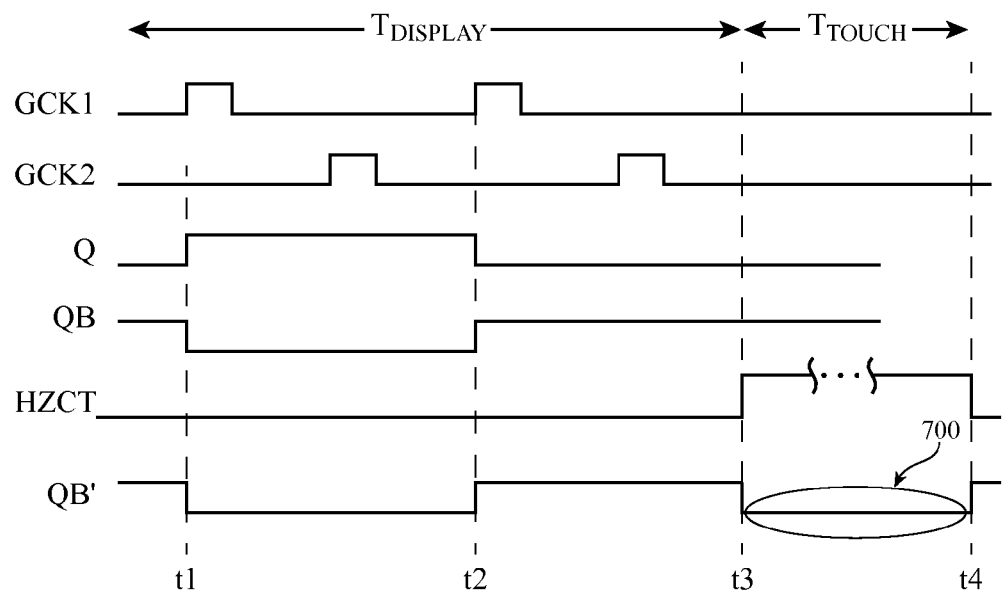
FIG. 7 is a timing diagram of relevant waveforms that illustrate the operation of a gate driver of the type shown in FIG. 6 in accordance with an embodiment.

The operation of gate driver 600 can be illustrated in the timing diagram of FIG. 7. At time t1, the first clock signal GCK1 may be pulsed high. In response to GCK1 rising high, signals Q and QB are driven high and low, respectively, to turn on the pass gate (i.e., to turn on transistors 604 and 606). Since HZCT is low during this time, gated signal QB' follows QB and is driven low. At time t2, clock GCK1 may be pulsed high again. In response to GCK1 clocking high at t2, signal Q and QB may be driven low and high, respectively, to turn off the pass gate. Since HZCT is low during the display period, gated signal QB' follows QB and is driven high.

At time t3, the display may be operated to support touch functions. From time t3 to t4 (e.g., during the display interval $T_{TOUCH}$), high-Z control signal HZCT may be asserted (e.g., driven high). Controlled as such, QB' is forced low during the touch interval (see, marked portion 700 in FIG. 7), thereby turning off pull-down transistor 608 and preventing the corresponding gate line from being actively driven to VGL. Since both the pull-down transistor 608 and the pass gate are off, the gate driver output is un-driven or floating and is therefore in an "high impedance" state. The use of logic gate 620 to turn off the pull-down transistor during touch operations is therefore sometimes referred to herein as operating the gate driver in high impedance mode.

The example of FIG. 6 in which the high-Z mode is implemented using a logic XOR gate is merely illustrative and does not serve to limit the scope of the present invention. If desired, a logic NOR gate can be used, an OR gate can be used, a NAND gate can be used, an AND gate can be used, or other suitable types of gating circuit can be used to gate signal QB. In accordance with another suitable embodiment, the high impedance mode may be implemented using an additional transistor that is coupled in series with the pull-down transistor (see, e.g., FIG. 8).

Figure 8:
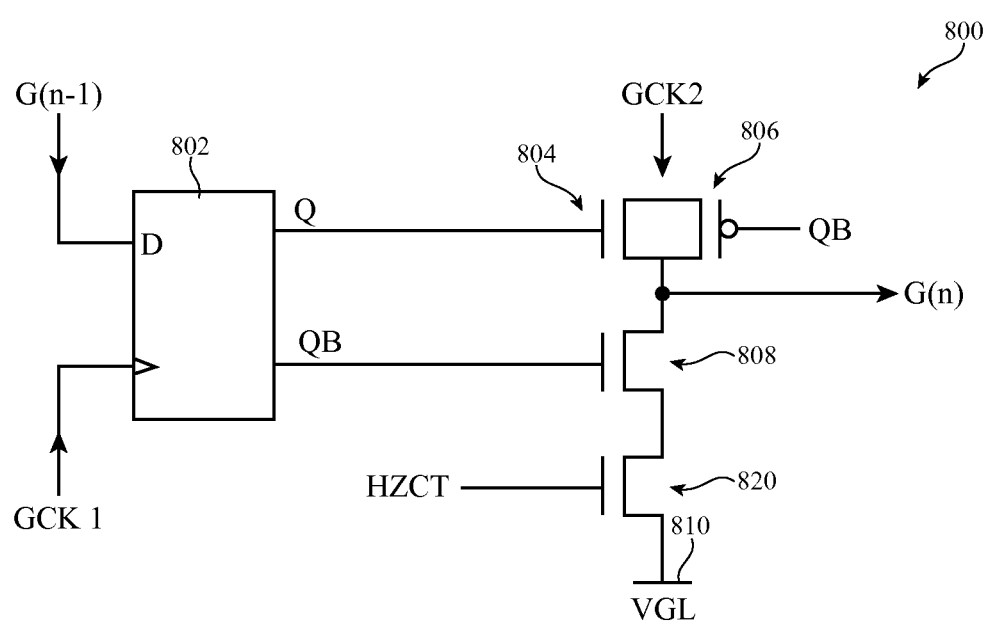
FIG. 8 is a circuit diagram of an illustrative gate driver circuit that includes a high impedance mode pull-down transistor in accordance with an embodiment.

As shown in FIG. 8, gate driver circuit 800 may include a digital latch 802, an n-channel transistor 804, a p-channel transistor 806, a first pull-down transistor 808, and a second pull-down transistor 820. Similar to previous embodiments, the n-channel transistor 804 and the p-channel transistor 806 are connected in parallel and are sometimes referred to collectively as a "pass gate." The pass gate may have a first terminal that receives a second clock signal GCK2 and a second terminal that is coupled to a power supply line 810 (e.g., a power supply line on which a ground voltage VGL is provided) via transistors 808 and 820 coupled in series. The second terminal may also serve as the output of gate driver 800. Latch 802 may have a clock input that receives a first clock signal GCK1, a data input that receives a gate line signal (e.g., G(n−1)) from a preceding gate driver, a first data output on which first latch output Q is provided, and a second data output on which second latch output QB is provided. N-channel transistor 804 may have a gate terminal that receives signal Q, whereas p-channel transistor 606 may have a gate terminal that receives signal QB. The first pull-down transistor 808 may receive signal QB from latch 802.

In particular, the second pull-down transistor 820 may receive a high-Z control signal HZCT directly at its gate terminal. Configured in this way, signal HZCT can be deasserted (i.e., driven low) to force deactivation of the second pull-down transistor 820 (to activate the high impedance mode) during the touch period and asserted to allow VGL to be selectively passed through to the corresponding gate line via the first pull-down transistor 808. In other words, high-Z control signal HZCT should be high during display periods and low during touch periods. The examples of FIGS. 6 and 8 of implementing high-Z mode are merely illustrative. If desired, other ways of selectively placing the gate driver in high impedance mode can be applied.

Figure 9:
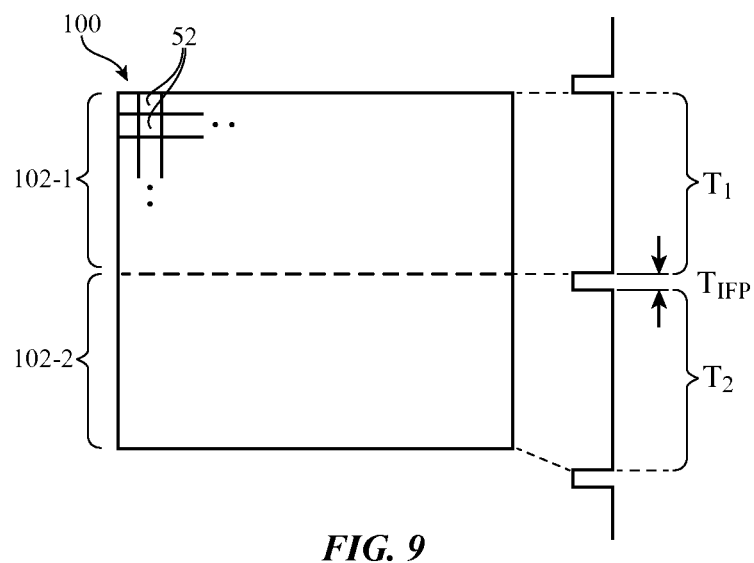
FIG. 9 is a diagram illustrating a single intra-frame pause (IFP) in accordance with an embodiment.

In some arrangements, it may be desirable to perform touch sensing at more frequent intervals. In accordance with at least some embodiments of the present invention, display 10 may be configured to implement an intra-frame pausing (IFP) scheme to allow touch sensing operations to be performed at relatively higher frequencies compared to the inter-frame pausing scheme. FIG. 9 is a diagram showing a single intra-frame pause. As shown in FIG. 9, a display pixel array 100 that includes image pixels 52 arranged in rows and columns may be organized into a first sub-frame 102-1 and a second sub-frame 102-2. First sub-frame 102-1 may be loaded with new display data during time period T1, whereas second sub-frame 102-2 may be loaded with new display data during time period T2. To implement a single IFP, an initial blanking interval may occur prior to loading first sub-frame 102-1 (i.e., immediately prior to period T1), and a single IFP blanking interval may be inserted after loading of first sub-frame 102-1 and prior to loading of second sub-frame 102-2 (i.e., between periods T1 and T2). After the second sub-frame 102-2 has been loaded with new display data, the steps described above may be repeated for the next frame.

Each blanking interval may have a duration $T_{IFP}$ during which touch sensing operations or other display/non-display related operations may be performed. The example of FIG. 9 in which the IFP is inserted at the middle of the frame is merely illustrative. If desired, the position of the IFP may be adjusted (e.g., the intra-frame pause may be inserted more towards the top of the frame or more towards the bottom of the frame). If desired, the duration of each blanking interval can also be adjusted (e.g., period $T_{IFP}$ may be adjusted).

Figure 10:
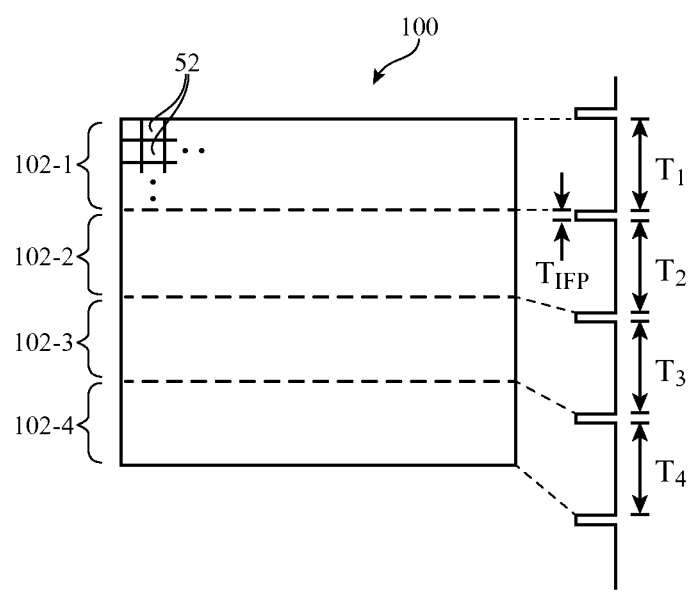
FIG. 10 is a diagram illustrating multiple intra-frame pauses (IFPs) in accordance with an embodiment.

In other suitable arrangements, multiple IFPs may be inserted within a single frame (see, e.g., FIG. 10). As shown in FIG. 10, display pixel array 100 may be organized into a first sub-frame 102-1, a second sub-frame 102-2, a third sub-frame 102-3, and a fourth sub-frame 102-4, each of which displays data for a quarter of the entire frame. First sub-frame 102-1 may be loaded with new display data during display interval T1; second sub-frame 102-2 may be loaded with new display data during display interval T2; third sub-frame 102-3 may be loaded with new display data during display interval T3; and fourth sub-frame 102-4 may be loaded with new display data during display interval T4. To implement multiple IFPs in this scenario, an initial blanking interval may occur prior to loading first sub-frame 102-1 (i.e., immediately prior to period T1), a first IFP blanking interval may be inserted after accessing sub-frame 102-1 and prior to accessing sub-frame 102-2 (i.e., between periods T1 and T2), a second IFP blanking interval may be inserted after accessing sub-frame 102-2 and prior to accessing sub-frame 102-3 (i.e., between periods T2 and T3), a third IFP blanking interval may be inserted after accessing sub-frame 102-3 and prior to accessing sub-frame 102-4 (i.e., between periods T3 and T4). After the fourth sub-frame 102-4 has been loaded with new display data, the steps described above may be repeated for the next frame.

The example of FIG. 5 in which the IFP is inserted at regular intervals within the frame is merely illustrative. In general, any number of IFPs may be inserted at any suitable location within the frame. If desired, the duration of each blanking interval may be adjusted, and the duration of each IFP blanking interval need not be the same.

Referring back to the timing example of FIG. 7, consider a scenario in which an IFP period is inserted immediately prior to time t2. In such scenario, the duration for which signal Q is high (and for which signal QB is low) will be lengthened by the duration of the IFP period. If this were the case, the pass gate transistors at the edges between successive IFP sub-frames will suffer from an elevated level of stress, which can result in degraded drive strength of those particular gate drivers (i.e., stress to thin-film transistors can cause hot carrier degradation, gate bias degradation, and self-heating effects) and can cause visible line noise and other undesirable image artifacts near the IFP row position in the display.

Figure 11:
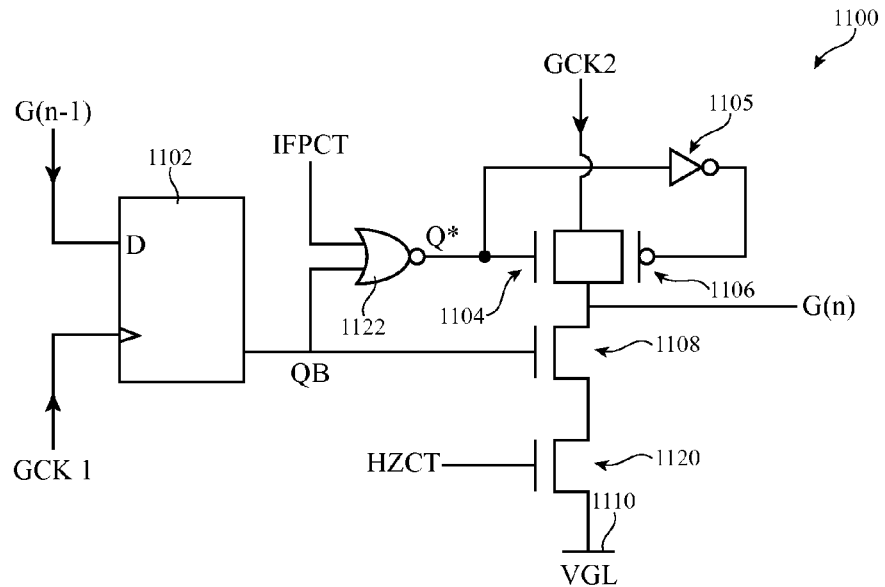
FIG. 11 is a circuit diagram of an illustrative gate driver circuit operable to support high impedance mode and intra-frame pausing in accordance with an embodiment.

In accordance with another suitable embodiment, a gate driver circuit 1100 is provided that is operable in a high-Z mode along with an IFP stress reduction mode that prevents the pass gate from being turned on during IFP intervals (see, e.g., FIG. 11). As shown in FIG. 11, gate driver circuit 1100 may include a clocked storage element 1102 (e.g., a digital latch circuit), an n-channel transistor 1104, a p-channel transistor 1106, a first pull-down transistor 1108, a second pull-down transistor 1120, and a logic gate such as logic NOR gate 1122. Similar to previous embodiments, the n-channel transistor 1104 and the p-channel transistor 1106 may be connected in parallel and are sometimes referred to collectively as a "pass gate." The pass gate may have a first terminal that receives a second clock signal GCK2 and a second terminal that is coupled to a power supply line 1110 (e.g., a power supply line on which a ground voltage VGL is provided) via transistors 1108 and 1120 coupled in series. The second terminal of the pass gate may also serve as the output of gate driver 1100. Latch 1102 may have a clock input that receives a first clock signal GCK1, a data input that receives a gate line signal (e.g., G(n−1)) from a preceding gate driver, a data output on which inverted output QB is provided.

To support the high impedance mode, the second pull-down transistor 1120 may receive a high-Z control signal HZCT directly at its gate terminal. Configured in this way, signal HZCT can be deasserted (i.e., driven low) to force deactivation of the second pull-down transistor 1120 (to activate the high impedance mode) during the touch period and asserted to allow VGL to be selectively passed through to the corresponding gate line via the first pull-down transistor 1108.

Still referring to FIG. 11, the logic NOR gate 1122 may have a first input that receives QB from data latch 1102, a second input that receives an IFP control signal IFPCT, and an output that is directly coupled to the gate of n-channel transistor 1104 and coupled to the gate of p-channel transistor 1106 through an inverter 1105. A gated signal Q* may be provided at the output of logic gate 1122 for controlling the state of the pass gate. Configured in this way, signal IFPCT can be asserted to help turn off the pass gate during IFP periods Twp and can be deasserted to allow an inverted version of signal QB to be passed through to transistors 1104 and 1106 through logic gate 1122. In other words, IFP control signal IFPCT should be low during display periods and high during IFP periods.

Figure 12:
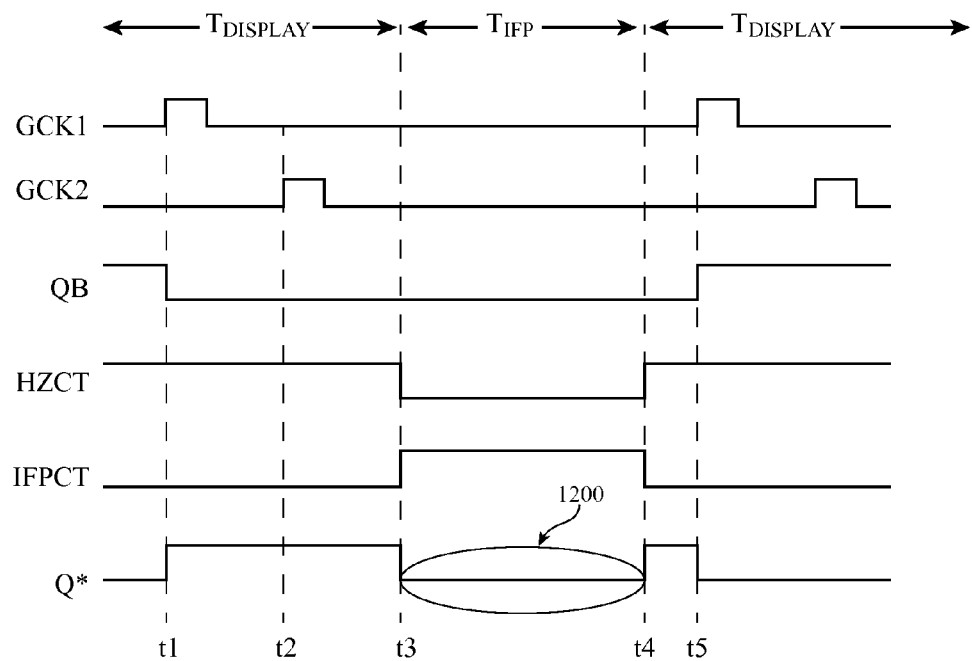
FIG. 12 is a timing diagram of relevant waveforms that illustrate the operation of a gate driver of the type shown in FIG. 11 in accordance with an embodiment.

The operation of gate driver 1100 can be illustrated in the timing diagram of FIG. 12. At time t1, the first clock signal GCK1 may be pulsed high. In response to GCK1 rising high, signal QB is driven low. Since IFPCT is low during this time, an inverted version of QB is passed through to transistors 1104 and 1106, thereby turning on the pass gate when QB is low. At time t2, GCK2 may be pulsed high to drive the corresponding gate line high (not shown in FIG. 12).

At time t3, an IFP period may be initiated. From time t3 to t4 (e.g., during the IFP interval $T_{IFP}$), high-Z control signal HZCT may be deasserted (e.g., to enable high-Z mode during IFP) whereas IFPCT may be asserted (e.g., driven high). Controlled in this way, Q* is forced low during the IFP interval (see, marked portion 1200 in FIG. 12, thereby turning off the pass gate and preventing the pass gate transistors from being unduly stressed during the IFP period. The use of logic gate 1122 to produce signal Q* is merely illustrative. If desired, a logic XOR gate can be used, an OR gate can be used, a NAND gate can be used, an AND gate can be used, or other suitable types of gating circuit can be used to gate signal QB for enabling IFP control. As illustrated in this example, it may be desirable to place the gate driver in high impedance mode during the IFP interval. At time t5, GCK1 may again be pulse high to restart the display operation.

In accordance with another suitable embodiment, a gate driver circuit may also be operated in an all-gate-high power down mode to prevent undesired effects from propagating during a display power-down event. During an intentional power-down event or when powering down a display due to an unexpected power supply disruption, permanent damage to the display may be avoided by ensuring that each display pixel is driven to a safe voltage. For example, in a display in which display pixels are driven between 7.5 volts and 15 volts (during frames of one polarity) and between 0 and 7.5 volts (during frames of an alternate polarity) on one electrode, and driven at a constant 7.5 volts on the other pixel electrode, the power-down operations are performed so that the voltage across the pixel between the two electrodes is maintained at or near 0 volts during the power down, rather than allowing the unmodified data values for the display pixels to be driven during the power down. The data values during power down on one electrode might otherwise cause relatively high voltages such as 7.5 volts relative to the second electrode to occur across the pixel during power down that could potentially then damage the display if left in place during and following the power down. Display driver circuitry may instead therefore be used to drive safe data (i.e., signals at a desired safe voltage that keeps the pixel voltage itself low) into the display pixels when powering down the display.

Figure 13:
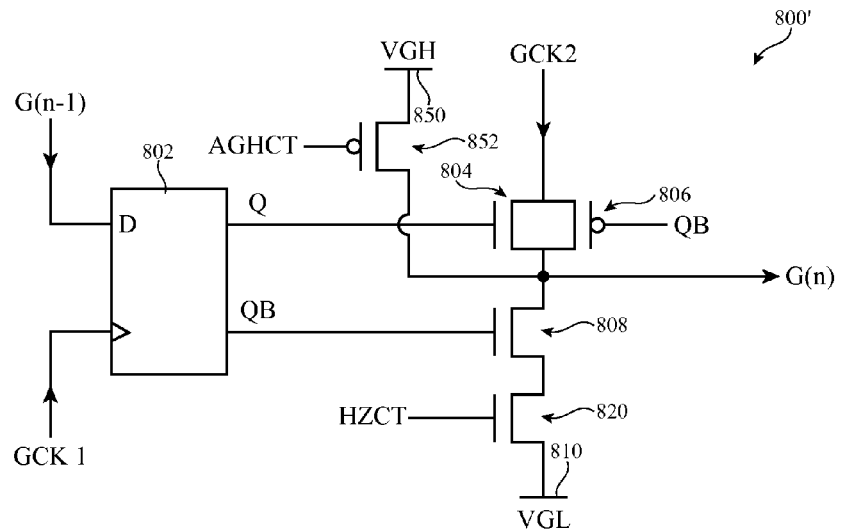
FIG. 13 is a circuit diagram of an illustrative gate driver circuit operable to support high impedance mode and an all-gate-high power down mode in accordance with an embodiment.

To support the driving of safe data into the display pixels during power down events, the gate lines of all the gate drivers will have to be asserted. FIG. 13 shows a gate driver circuit 800' that is operable in both high-Z mode and an all-gate-high (AGH) power down mode. The portion of gate driver 800' that implements the high-Z mode is similar to that described in detail in connection with FIG. 8 and is therefore not repeated herein in order not to unnecessarily obscure the description of FIG. 13.

Figure 14:
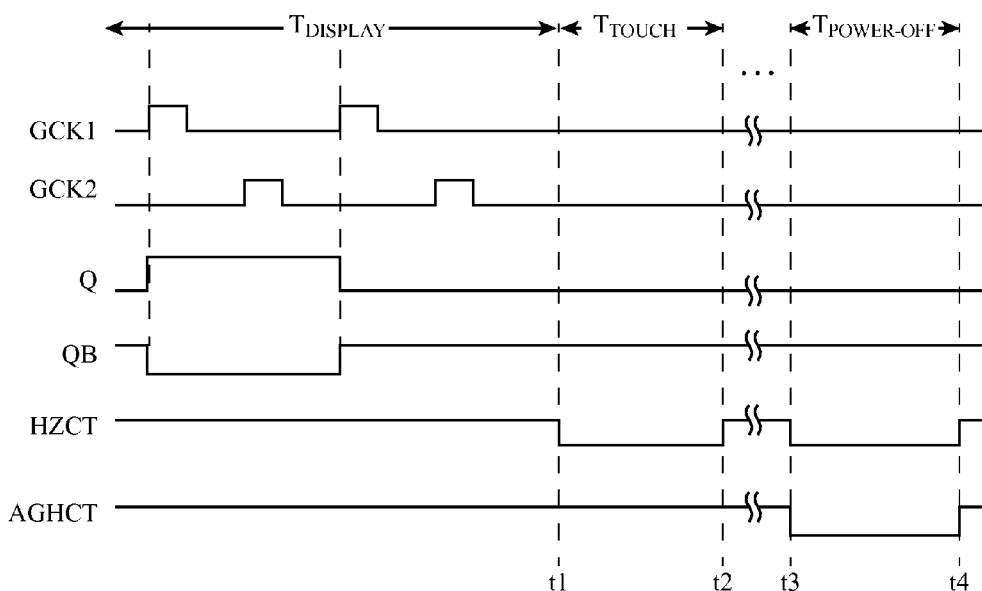
FIG. 14 is a timing diagram of relevant waveforms that illustrate the operation of a gate driver of the type shown in FIG. 13 in accordance with an embodiment.

In particular, gate driver 800' may be provided with an additional p-channel transistor 852 having a source terminal that is connected to a power supply line (e.g., a power supply terminal on which a positive power supply voltage VGH is provided), a drain terminal that is connected to the output of gate driver 800', and a gate terminal that receives an all-gate-high control signal AGHCT. Configured in this way, signal AGHCT can be asserted (i.e., driven low) to help pull the gate line up to VGH during a power down event and can be deasserted (i.e., driven high) to deactivate the AGH transistor during display and/or touch periods. In other words, AGHCT should be high during display and touch periods and low during power down period $T_{POWER-OFF}$, as shown in the timing diagram of FIG. 14. FIG. 14 also shows how high-Z control signal HZCT should be driven low during $T_{POWER-OFF}$ (e.g., both signals AGHCT and HZCT are driven low between time t3 and t4 to turn on AGH transistor 852 while turning off pull-down transistor 820).

Figure 15:
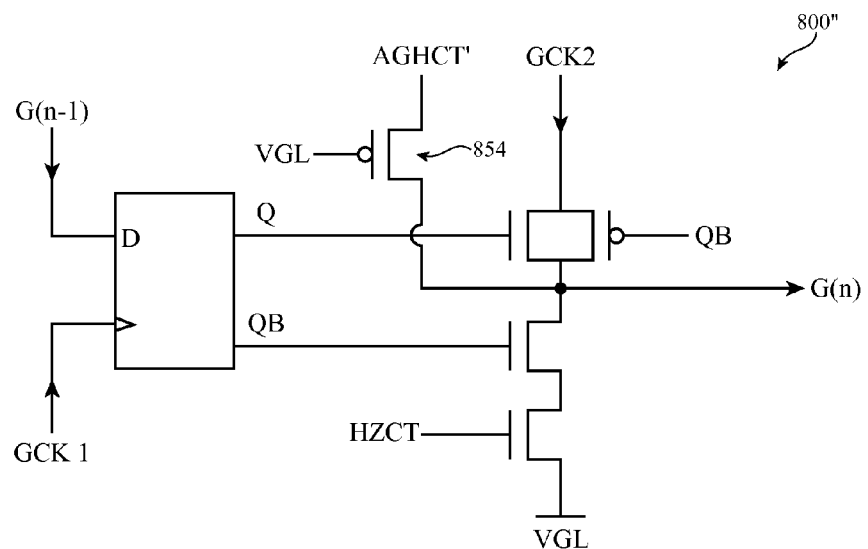
FIG. 15 is a circuit diagram of an illustrative gate driver circuit operable to support high impedance mode and an all-gate-high power down mode in accordance with another embodiment.

FIG. 15 shows another suitable embodiment of a gate driver circuit 800" that supports the all-gate-high power down mode and the high-Z mode. The portion of gate driver 800" that implements the high-Z mode is similar to that described in detail in connection with FIG. 8 and is therefore not repeated herein in order not to unnecessarily obscure the description of FIG. 15.

Figure 16:
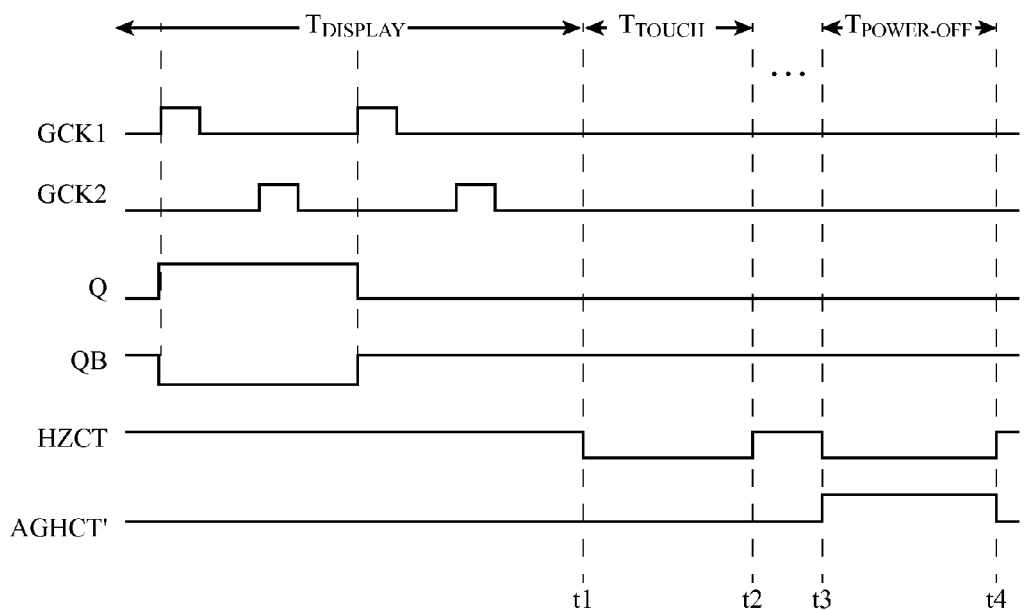
FIG. 16 is a timing diagram of relevant waveforms that illustrate the operation of a gate driver of the type shown in FIG. 15 in accordance with an embodiment.

In particular, gate driver 800" may be provided with an additional p-channel transistor 854 having a source terminal that receives an all-gate-high control signal AGHCT', a gate terminal that receives ground voltage VGL, and a drain terminal that is connected to the output of gate driver 800". Configured in this way, signal AGHCT' can be asserted (i.e., driven high) to help pull the gate line up to VGH during a power down event and can be deasserted (i.e., driven low) to deactivate the AGH transistor during display and/or touch periods. In other words, AGHCT' should be low during display and touch periods and high during power down period $T_{POWER-OFF}$, as shown in the timing diagram of FIG. 16. FIG. 16 also shows how high-Z control signal HZCT is driven low while the AGHCT' signal is driven high between time t3 and t4.

The use of a p-channel transistor to implement the all-gate-high capability in the examples of FIGS. 13 and 15 are merely illustrative. If desired, other ways of driving the gate lines high during power off periods can be used.

Figure 17:
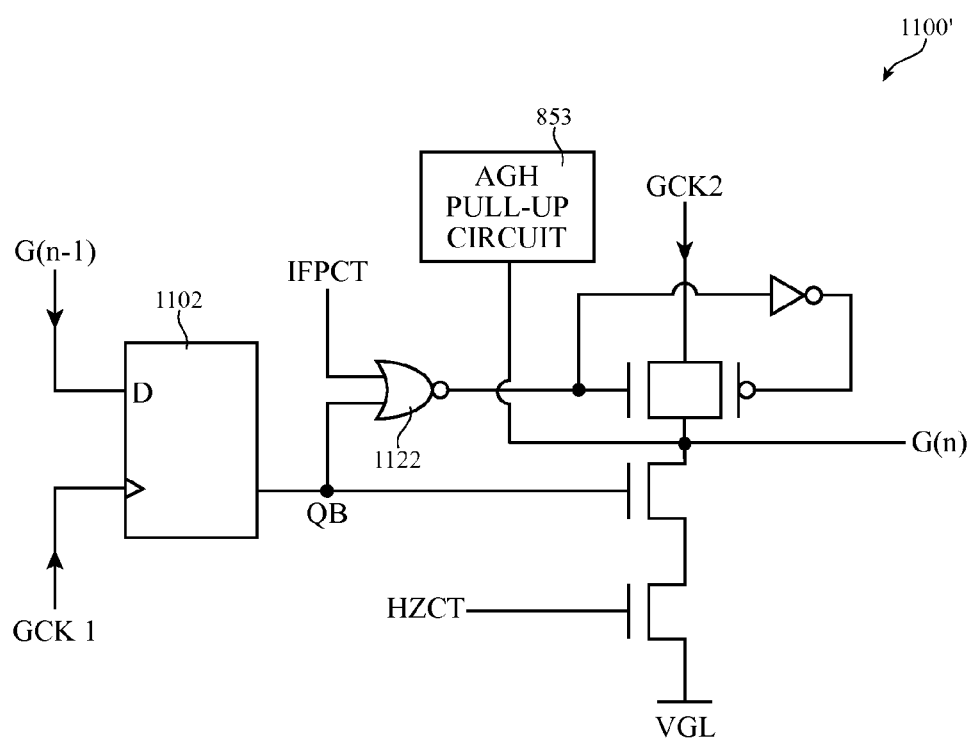
FIG. 17 is a circuit diagram of an illustrative gate driver circuit operable to support a high impedance mode, an all-gate-high power down mode, and intra-frame pausing in accordance with an embodiment.

In general, the foregoing embodiments may be implemented individually or in any combination. FIG. 17 is a circuit diagram of a gate driver 1100' that is operable in a high impedance mode, an IFP stress reduction mode, and an AGH power down mode. The portion of gate driver 1100' that implements the high-Z mode and the IFP stress reduction mode is similar to that described in detail in connection with FIG. 11 and is therefore not repeated herein in order not to unnecessarily obscure the description of FIG. 17. As shown in FIG. 17, the output of gate driver circuit 1100' may also be coupled to an all-gate-high (AGH) pull-up circuit 853. The AGH pull-up circuit 853 may represent the AGH mode implementation as shown in FIG. 13, FIG. 15, or other suitable implementations. For example, control signal HZCT may be driven low to turn off the second pull-down transistor during IFP intervals and power-down intervals (as illustrated in FIGS. 14 and 16), control signal IFPCT may be driven high to deactivate the pass gate during IFP intervals, and the AGH pull-up circuit 853 may be enabled during power-down intervals to drive all the gate lines high (as illustrated in FIGS. 14 and 16). In general, the AGH pull-up circuit 853 may be configured to drive the gate line output to VGH or any other predetermined voltage level (e.g., VGL, some intermediate voltage level, a negative voltage level, a boosted voltage level that is greater than VGH, etc.).

Figure 18:
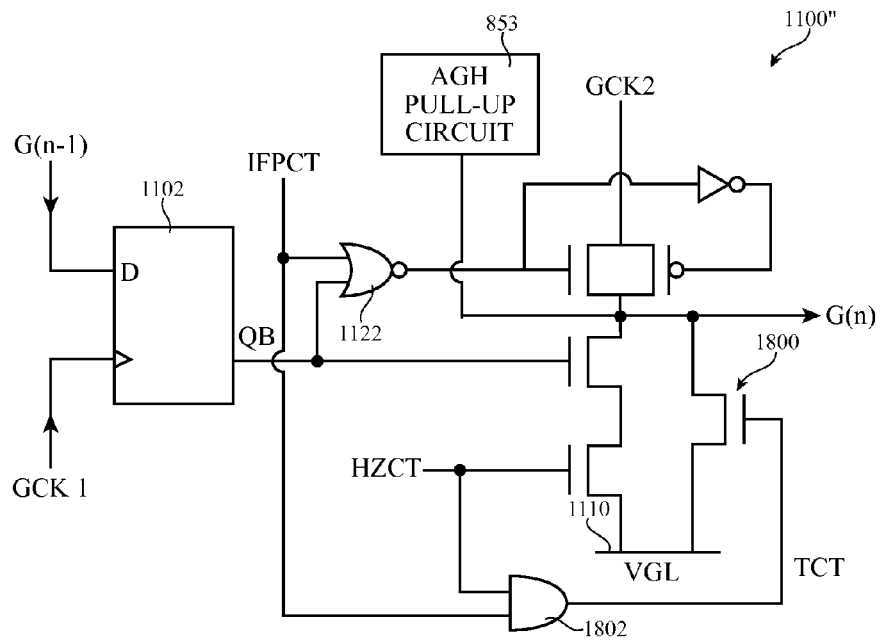
FIG. 18 is a circuit diagram of an illustrative gate driver circuit that is operable to support a high impedance mode, an all-gate-high power down mode, and intra-frame pausing and that includes a grounding tail transistor in accordance with an embodiment.

FIG. 18 shows yet another suitable embodiment of a gate driver circuit such as gate driver 1100" that is similar to the arrangement of FIG. 17 but includes a tail transistor 1800 that is coupled between the output of driver 1100" and ground line 1110 (e.g., the tail transistor may be coupled in parallel with the series-connected pull-down transistors). As shown in FIG. 18, gate driver 1100" may also include a logic AND gate 1802 having a first input that receives control signal HZCT, a second input that receives control signal IFPCT, and an output that is coupled to a gate terminal of tail transistor 1800 (e.g., an output on which tail transistor control signal TCT is provided). Configured in this way, tail transistor control signal TCT is only asserted when both HZCT and IFPCT are both high simultaneously.

Figure 19:
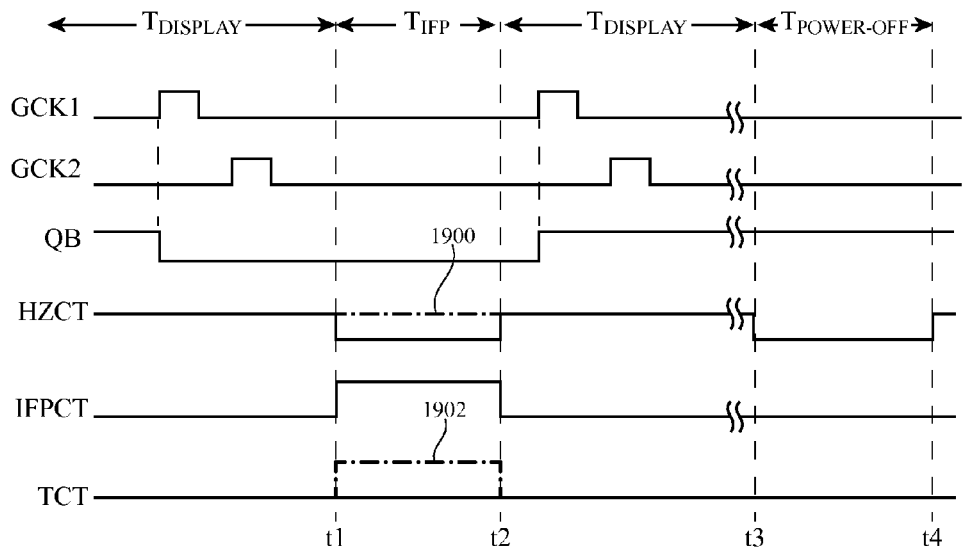
FIG. 19 is a timing diagram of relevant waveforms that illustrate the operation of a gate driver of the type shown in FIG. 18 in accordance with an embodiment.

The use of the tail transistor to short the gate driver output to VGL during touch or IFP intervals may be desired when the high-Z mode is deactivated during those times. The operation of gate driver 1100" of FIG. 18 is illustrated by the timing diagram of FIG. 19. As shown in FIG. 19, when control signal HZCT is driven high during the IFP period (as shown by the dotted waveform portion 1900), the high-Z mode is effectively deactivated. Since control signal IFPCT is high during the IFP period, however, TCT is driven high (as indicated by the dotted waveform portion 1902) and thereby turns on the tail transistor 1800 to effectively drive the gate driver output to VGL. The example of FIG. 18 that enables use of either the high-Z mode pull-down transistor (i.e., the pull-down transistor receiving signal HZCT) or the tail transistor 1800 during device operation is merely illustrative. If desired, other ways of switching selective portions of a gate driver circuit into use or out of use may be implemented.

The foregoing is merely illustrative of the principles of this invention and various modifications can be made by those skilled in the art without departing from the scope and spirit of the invention. The foregoing embodiments may be implemented individually or in any combination.

What is claimed is:

1. Display circuitry, comprising:
    a display pixel array; and
    gate driver circuitry that is coupled to the display pixel array and that is operable to display images during a display period and to support touch sensing operations during a blanking period, wherein the gate driver circuitry includes a plurality of gate drivers, and wherein a given gate driver in the plurality of gate drivers comprises:
        a latching circuit that generates a latch output signal;
        a pass gate that receives the latch output signal; and
        a pull-down transistor that is coupled in series with the pass gate and that is turned off during the blanking period to place the given gate driver in a high impedance mode.

2. The display circuitry defined in claim 1, wherein the given gate driver further comprises:
    a logic gate interposed between the latching circuit and the pull-down transistor.

3. The display circuitry defined in claim 2, wherein the logic gate comprises a logic exclusive-OR gate.

4. The display circuitry defined in claim 1, wherein the given gate driver further comprising:
    an additional pull-down transistor that is coupled in series with the pull-down transistor and the pass gate, wherein the additional pull-down transistor receives another latch output signal from the latching circuit.

5. The display circuitry defined in claim 1, wherein the given gate driver further comprises:
    a gating logic circuit through which the latch output signal is coupled to the pass gate, wherein the pull-down transistor receives a first control signal, and wherein the gating logic circuit receives a second control signal that is different than the first control signal.

6. The display circuitry defined in claim 5, wherein the gating logic circuit comprises a logic NOR gate.

7. The display circuitry defined in claim 1, wherein the given gate driver further comprises:
    a pull-up circuit that is coupled to the pass gate and that is always turned on when the display circuitry is operated in a power-down mode.

8. The display circuitry defined in claim 7, wherein the pull-up circuit comprises a pull-up transistor having a source terminal that receives a positive power supply voltage, a gate terminal that receives an adjustable control voltage, and a drain terminal that is directly coupled to the pass gate.

9. The display circuitry defined in claim 7, wherein the pull-up circuit comprises a pull-up transistor having a source terminal that receives an adjustable control voltage, a gate terminal that receives a ground power supply voltage, and a drain terminal that is directly coupled to the pass gate.

10. The display circuitry defined in claim 1, wherein the pass gate comprises an n-channel transistor and a p-channel transistor coupled in parallel.

11. A method for operating a display gate driver circuit that includes a digital latch, a digital pass gate that receives a latch output signal from the digital latch, and a pull-down transistor that is coupled in series with the digital pass gate, the method comprising:
    outputting a gate line signal with the display gate driver circuit;
    during a display interval, using the display gate driver circuit to actively drive the gate line signal; and
    during a blanking interval that is different than the display interval, placing the display gate driver circuit in a high impedance mode so that the gate line signal is floating by deactivating the pull-down transistor.

12. The method defined in claim 11, wherein deactivating the pull-down transistor comprises asserting a first control signal to turn off the pull-down transistor.

13. The method defined in claim 12, further comprising:
during the blanking interval, deactivating the digital pass gate by asserting a second control signal that is different than the first control signal.

14. The method defined in claim 13, further comprising:
during a display power-off event, activating a pull-up circuit to drive the gate line signal to a predetermined voltage level by asserting a third control signal that is different than the first and second control signals.

15. The method defined in claim 11, further comprising:
during the blanking interval, disabling the high impedance mode and enabling a tail transistor that is coupled in parallel with the pull-down transistor to drive the gate line signal to ground.

16. Display gate driver circuitry, comprising:
a plurality of gate drivers connected in a chain, wherein a gate driver in the plurality of gate drivers comprises:
 a pull-down transistor that is controlled by a first control signal that places the gate driver in a high impedance mode;
 a pass gate that is coupled in series with the pull-down transistor and that is controlled using a second control signal that places the gate driver in intra-frame pause (IFP) reduced stress mode;
 an output terminal coupled between the pull-down transistor and the pass gate; and
 a pull-up circuit that is coupled to the output terminal and that is controlled by a third control signal that places the gate driver in an all-gate-high (AGH) power-down mode.

17. The display gate driver circuitry defined in claim 16, wherein the output terminal of each gate driver in the plurality of gate drivers is driven to the same predetermined voltage level while being placed in the all-gate-high power-down mode.

18. The display gate driver circuitry defined in claim 16, wherein the gate driver further comprises:
 a digital latch that is coupled to the pass gate; and
 a logic gate that is interposed between the digital latch and the pull-down transistor and that receives the first control signal.

19. The display gate driver circuitry defined in claim 16, wherein the gate driver further comprises:
 a digital latch that is coupled to the pull-down transistor; and
 a logic gate that is interposed between the digital latch and the pass gate and that receives the second control signal.

20. The display gate driver circuitry defined in claim 16, wherein the gate driver further comprises:
 a tail transistor that is coupled in parallel with the pull-down transistor, wherein the tail transistor receives a fourth control signal that is generated from a combination of the first and second control signals.

* * * * *